(12) United States Patent
    Tillotson (10) Patent No.: US 11,332,260 B2
(45) Date of Patent: May 17, 2022

(54) ELECTRODE-ARC SENSOR AIR DATA SYSTEM FOR AN AIRCRAFT

(71) Applicant: The Boeing Company, Chicago, IL (US)

(72) Inventor: Brian Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 303 days.

(21) Appl. No.: 16/687,045

(22) Filed: Nov. 18, 2019

(65) Prior Publication Data

US 2021/0147096 A1    May 20, 2021

(51) Int. Cl.
    *B64D 43/02* (2006.01)
    *G01P 13/02* (2006.01)
    *G01S 17/58* (2006.01)

(52) U.S. Cl.
    CPC ............ *B64D 43/02* (2013.01); *G01P 13/025* (2013.01); *G01S 17/58* (2013.01)

(58) Field of Classification Search
    CPC ........ G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00;
    (Continued)

(56) References Cited

U.S. PATENT DOCUMENTS

| 2,679,162 A | 5/1954 | Stuart |
| 7,463,341 B2 | 12/2008 | Halldorsson et al. |
| 7,495,774 B2 | 2/2009 | Hays et al. |
| 8,256,284 B2 | 9/2012 | Vozhdaev et al. |
| 8,434,358 B2 | 5/2013 | Asahara et al. |
| 10,352,813 B2 | 7/2019 | Cooper et al. |

(Continued)

FOREIGN PATENT DOCUMENTS

| CN | 111674552 A | * | 9/2020 |
| CN | 113009178 A | * | 6/2021 |

(Continued)

OTHER PUBLICATIONS

Search Report for related European Application No. 20201179.7; report dated Mar. 9, 2021.

*Primary Examiner* — Andre J Allen
(74) *Attorney, Agent, or Firm* — Quinn IP Law (57) ABSTRACT

An electrode-arc sensor for measuring air data. The sensor includes a pair of electrodes which are arranged substantially parallel to one another to form a fluid gap therebetween. The fluid gap is arranged to receive a stream of fluid such as air. A voltage source is operatively connected to the pair of electrodes to generate a voltage and induce an arc therebetween. A controller operatively connected to the voltage source is configured to command the voltage source to generate a voltage until the arc is induced. Once induced, a time-series of the voltage measurements is generated based on a voltage sensor across the pair of electrodes. The ionized air surrounding the induced arc is acted upon by the fluid stream. The controller determines a fluid speed and fluid density of the fluid stream based on the time series of voltage measurement as the arc travels past the pair of electrodes.

20 Claims, 9 Drawing Sheets

(58) Field of Classification Search
CPC ......... G01P 5/001; B65D 43/02; B65D 15/20; B65D 43/00; B65D 15/12; B65D 1/18; B65D 1/20; B65D 15/16; B65D 15/22; B65D 2033/0286; B65D 33/02; B65D 45/00; B65D 33/08; G01F 1/28; G01F 1/46; G01F 1/64; G01F 1/68; G01F 1/176; G01F 1/3254; G01F 1/708; G01F 1/7084; G01F 1/72; G01F 1/203; G01F 25/003; G01S 15/588; G01S 17/95; G01S 1/02; G01S 13/426; G01S 13/953; G01S 15/60; G01S 17/32; G01S 17/58; G01S 17/88; G01S 7/521; G01S 11/14
USPC ...................................................... 73/170.02
See application file for complete search history.

(56) References Cited

U.S. PATENT DOCUMENTS

| | | | |
|---|---|---|---|
| 10,444,367 | B2 | 10/2019 | Lodden et al. |
| 2005/0199408 | A1* | 9/2005 | Keppel ................... F01N 3/01 174/36 |
| 2012/0078540 | A1 | 3/2012 | McIntyre |
| 2014/0144517 | A1 | 5/2014 | Raja et al. |

FOREIGN PATENT DOCUMENTS

| | | |
|---|---|---|
| JP | S539149 A | 1/1978 |
| JP | S5394971 A | 8/1978 |
| JP | S53147759 U | 11/1978 |
| JP | H01302116 A | 12/1989 |
| KR | 101726370 B1 | 4/2017 |

* cited by examiner

ELECTRODE-ARC SENSOR AIR DATA SYSTEM FOR AN AIRCRAFT

TECHNICAL FIELD

The present disclosure relates generally to sensor systems and more specifically air data sensor systems for use with aircrafts for measuring airspeed and air density.

BACKGROUND

In avionic systems, many sensor systems are available for measuring local air data such as airspeed, air density, angle of attack, side slip angle, and the like that are required for operation of the aircraft. Many types of sensors exists for generating the air data, but typically a pitot-static systems are widely used to determine the airspeed of an aircraft. For example, to compute airspeed a dynamic pressure is determined based on a difference between a pitot tube pressure and a static pressure obtained through a static port. While pitot-static systems are widely used, they suffer from a few common mode failures such as blockages; icing at higher altitudes, and overheating at supersonic speeds and faster. Light Detection and Ranging (LIDAR) based systems have been developed to overcome many of these common mode failures. The LIDAR based systems operate by measuring laser scattering of air particulates to estimate airspeed based on Doppler measurements. However, at higher altitudes such as those for supersonic or hypersonic flight, the particulate concentrations are too low to estimate air data thus rendering LIDAR based systems unreliable for such applications. Thus, there exists a need for reliably monitoring air data at high velocities and/or high altitudes while remaining immune to common mode failures of existing air data systems.

SUMMARY

In accordance with one aspect of the present disclosure, an electrode-arc sensor for measuring fluid data is described. The electrode-arc sensor comprises a first electrode and a second electrode arranged substantially parallel and spaced from the first electrode to form a fluid gap therebetween for receiving a fluid stream, wherein the first and second electrodes directly contact the fluid stream. A voltage source is operatively connected to the first and second electrodes and configured to generate a voltage sufficient to induce an arc therebetween; and a voltage sensor is configured to detect voltage measurements across the first and second electrodes. A controller is operatively connected to the voltage source and voltage sensor and is configured to ramp the voltage source until the arc is induced. The controller generates a time-series of voltage measurements from the voltage sensor, and determines a fluid speed and a fluid density of the fluid stream based on the time-series of voltage measurements.

In accordance with another aspect of the present disclosure, a vehicle is described. The vehicle comprises an external surface in direct contact with a fluid medium. The vehicle also comprises an electrode-arc sensor disposed on the external surface to determine fluid data of the fluid medium. The electrode-arc sensor comprises a first electrode, a second electrode, a voltage source, a voltage sensor, and a controller. The second electrode is arranged substantially parallel and spaced from the first electrode to form a fluid gap therebetween for receiving a fluid stream. The first and second electrodes are arranged to directly contact the fluid stream. The voltage source is operatively connected the first and second electrodes and configured to generate a voltage sufficient to induce an arc therebetween. The voltage sensor is configured to detect voltage measurements across the first and second electrodes. A controller is operatively connected to the voltage source and the voltage sensor. The controller is configured to ramp the voltage source until the arc is induced; generate a time-series of voltage measurements from the voltage sensor; determine a fluid speed and fluid density of the fluid stream based on the time series of voltage measurements; and display the determined airspeed on an indicator.

In accordance with another aspect of the present disclosure, a method for determining fluid data of a vehicle travelling through a fluid medium is described. The method comprises controlling a voltage source to generate a voltage sufficient to induce an arc between a first and second electrode, the first electrode being substantially parallel to and spaced from the second electrodes to form a fluid gap therebetween for receiving a fluid stream, wherein the first and second electrodes directly contact the fluid stream. The method further detecting voltage measurements across the first and second electrodes; ramping the voltage source is ramped until the arc is induced; generating a time series of the voltage measurements; and determining a fluid speed and fluid density of the fluid stream based on the time series of voltage measurements.

While the present disclosure is susceptible to various modifications and alternative constructions, certain illustrative examples thereof will be shown and described below in detail. The disclosure is not limited to the specific examples disclosed, but instead includes all modifications, alternative constructions, and equivalents thereof.

DETAILED DESCRIPTION

The following detailed description will illustrate the general principles of the system and method, examples of which are additionally illustrated in the accompanying drawings. In the drawings, like reference numbers indicate identical or functionally similar elements.

While the exemplary system and method may be embodied in different forms, there is shown in the drawings, and herein will be described in detail, a specific example for an air data system with an electrode-arc sensor for measuring air data forming part of an aircraft. The air data system can be implemented as a fluid data system in various applications which require measuring fluid velocity and/or density of non-conductive fluids. For example, the electrode-arc sensor can be implemented on, but not limited to, relative wind measurement for surface marine vessels; aircrafts including airplanes, helicopters, drones, dirigibles, rockets and the like; ranged weaponry such as rockets or guided missiles; or even ground vehicles such as high-speed race vehicles. With the understanding that the present disclosure is to be considered an exemplification of the principles of the system and method, and is not intended to limit the system and method to that as illustrated and described herein. For example, the system and method may be implemented as military, commercial, or personal applications for high speed air data measurements. Therefore, unless otherwise noted, features disclosed herein may be combined together to form additional combinations.

The air data system is configured to measure at least one of a breakdown voltage $V_B$ or an arc frequency $f_{arc}$ and map the measured values to a predetermined model to estimate the corresponding airspeed $V_{AIR}$ and air density $\rho_{AIR}$. The predetermined models can be generated based on computational modelling, flight test measurements, wind tunnel measurements, or any combination thereof which will be discussed in further detail.

Figure 1:
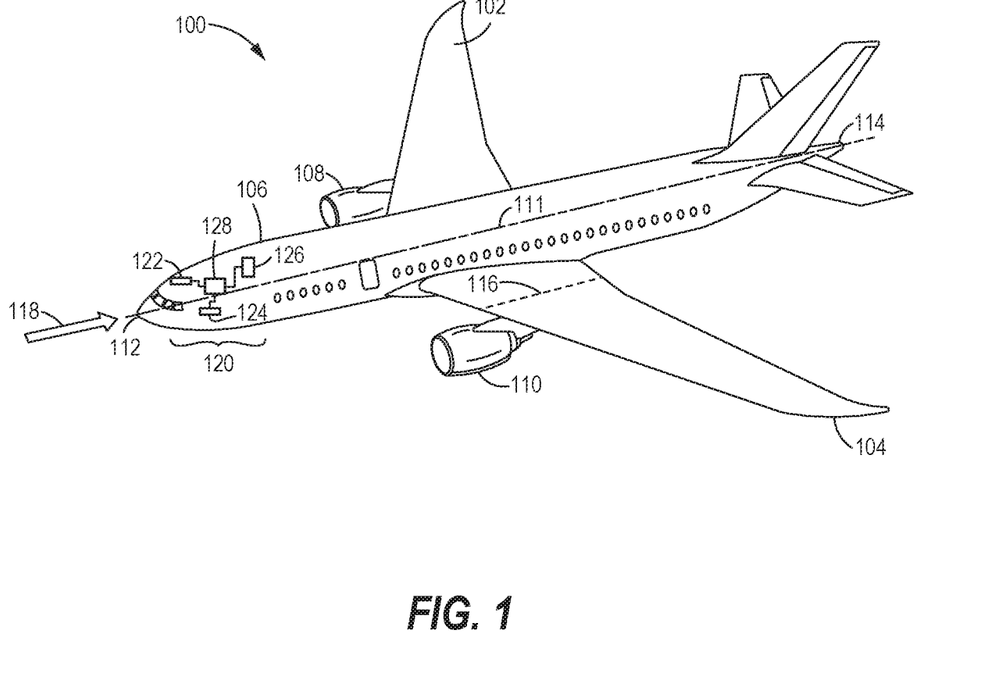
FIG. 1 is an illustration of an aircraft with an air data system in accordance with an example of the present disclosure.

With reference now to the figures, in particular, with reference to FIG. 1, an illustration of an aircraft is depicted in accordance with an illustrative embodiment. In the illustrative embodiment, an aircraft 100 has wings 102, 104 attached to a fuselage 106. The aircraft 100 includes engine 108 attached to a wing 102 and engine 110 attached to wing 104. The aircraft 100 may include a plurality of axes such as a longitudinal axis 111 that runs along the fuselage 106 from the nose 112 to the tail 114. Another axis may include a chord line 116. For example, the wings 102, 104 each may define a chord line 116 which is a line joining the leading and trailing edges of the wing in the direction of flow of an airstream 118. It should be appreciated that any type of chord line is contemplated such as the root chord, mean aerodynamic chord, tip chord, or the like. Any of the axes of the aircraft 100 may also be understood as a chord line, for example, the longitudinal axis 111 may be understood as a type of chord line.

The aircraft 100 is an example of a vehicle travelling through a fluid medium, such as air, in which the air data system may be implemented in accordance with the illustrated embodiment. The air data system provides information about the air data used by the various on-board systems to operate the aircraft 100 at high altitudes and/or high velocities in a manner that reliably produces air data information. The illustrative embodiment will be described in terms of air as the fluid medium; however, it should be appreciated that other vehicles and/or objects travelling through or receiving non-conductive fluids are also contemplated.

The air data generated may include, but not limited to air speed, air density, angle of attack (AoA) vector, side slip vector, and the like. The aircraft 100 includes an air data system 120 for generating the air data which is used by on-board systems to operate the aircraft reliably. The air data system 120 comprises a plurality of electrode-arc sensors 122, 124, 126 operatively coupled to an air data controller 128 for determining the air data based on detected measurements as will be discussed in greater detail below.

The electrode-arc sensors 122, 124, 126 can be disposed on an external surface of the fuselage 106 such that they are in direct contact with the airstream 118. Each electrode-arc sensors 122, 124, 126 may have a unique, known orientation relative to the fuselage 106, longitudinal axis 111, and/or chord line 116 to determine the various types of air data measurements. For example, the aircraft 100 may have an airspeed electrode arc sensor 122, AoA electrode-arc sensor 124, side slip electrode arc sensor 126, and the like. The airspeed electrode arc sensor 122 can be arranged substantially parallel to a longitudinal axis 111 of the fuselage 106 in order to determine an airspeed of the airstream 118 as it passes over the fuselage 106. The AoA electrode-arc sensor 124 can be arranged slightly off-pitch with the chord line 116 in order to determine the AoA vector of the aircraft 100 relative to the airstream 118. The side slip electrode arc sensor 126 can be arranged substantially perpendicular to the longitudinal axis 111 and/or chord line 116 to determine the slide slip angle of the aircraft 100 relative to the airstream 118. While only a single airspeed, AoA, and side slip electrode-arc sensors 122, 124, 126 are depicted, it should be appreciated that the air data system 120 may include multiples of each sensor for redundancy and accuracy, or other electrode arc sensors and arrangements for air data not yet contemplated.

The electrode-arc sensors 122, 124, 126 may operate by inducing an arc between a pair of electrodes arranged to form an air gap through which the airstream 118 flows and the arc is induced. When a voltage potential is applied to the pair of electrodes that exceeds the $V_B$, the gas between the electrodes, e.g. the airstream 118, is ionized and the resistance between the electrodes is greatly reduced and a resulting arc is formed therebetween. The arc can persist as long as the voltage potential does not fall below a holding voltage. The ionized air surrounding the arc can be acted upon by the flowing airstream 118 which can then push the arc in the direction of travel. When the arc reaches a rear end of the electrode, it is pushed past the electrodes in the direction of travel and dissipates. By measuring the $V_B$ and the frequency $f_{arc}$ of the arc lifetime of each induced arc, the air data system 120 can determine the air density and airspeed of the airstream 118 based on a comparison to an air data model.

Figure 2:
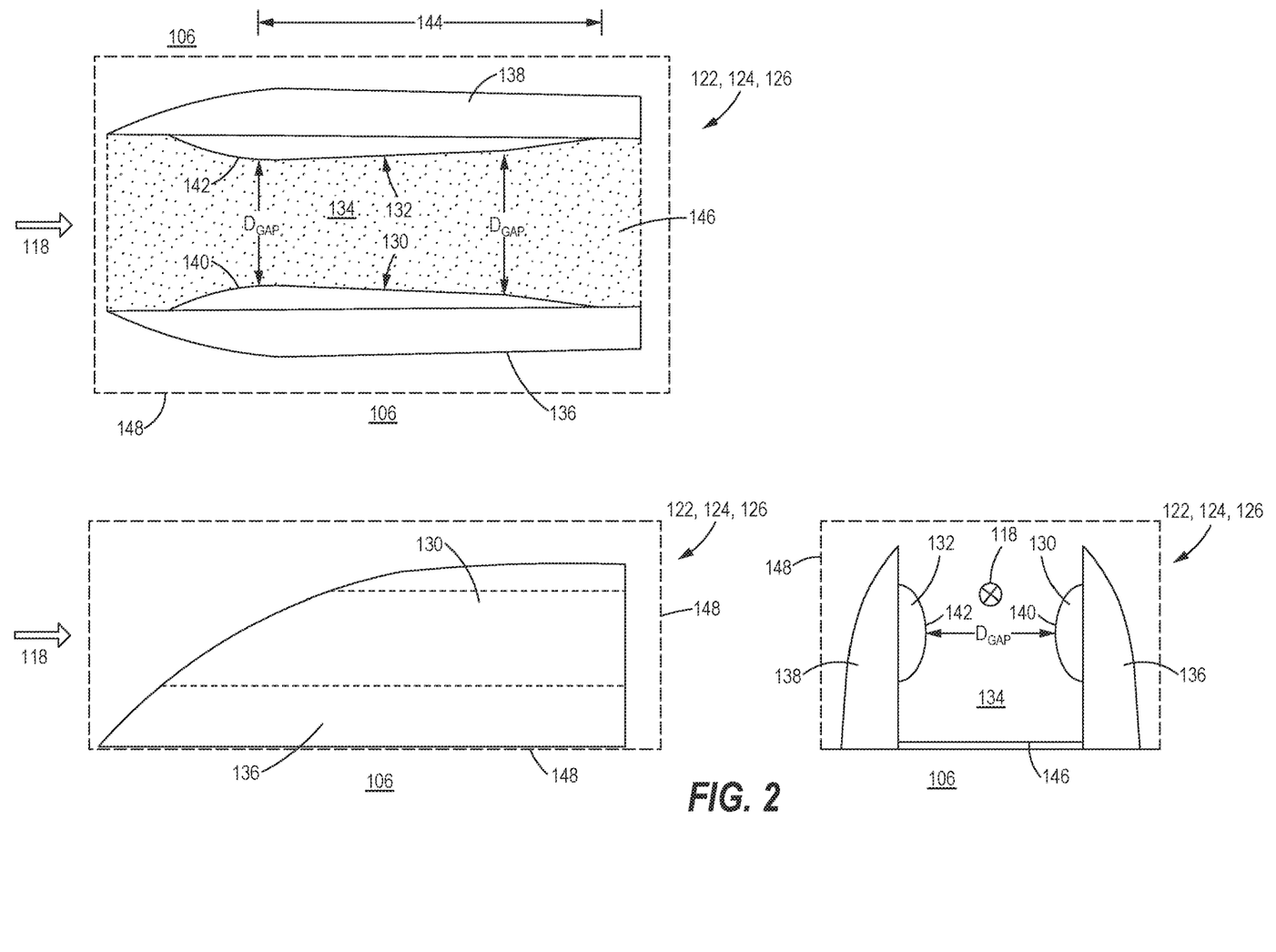
FIG. 2 is an illustration of an air data sensor in accordance with an example of the present disclosure.

With reference to FIG. 2, an orthographic illustration of the electrode-arc sensors 122, 124, 126 is depicted in accordance with the illustrative embodiment. Each electrode-arc sensor 122, 124, 126 includes a first electrode 130 and a second electrode 132 which is substantially parallel to and spaced apart from the first electrode 130 to form an air gap 134 therebetween for receiving the airstream 118 during flight. While the electrodes are depicted as substantially normal to the exterior surface of the aircraft 100, they may have an angled orientation to coincide with the design specifications of the vehicle or the fluid medium. The first and second electrodes 130, 132 are arranged such that they are directly contacting the airstream 118. The first electrode 130 may be supported by a first pylon 136 and the second electrode 132 may be supported by a second pylon 138. The first and second pylons 136, 138 are arranged substantially parallel to one another and substantially normal with respect to the exterior surface of the fuselage 106, but also other configurations and/or orientations are also contemplated based on designs requirements. The pylons 136, 138 may be shaped or contoured in order to reduced frictional drag and/or minimize shock formation at supersonic and hypersonic speeds. For example, the forward contour of the pylons 136, 138 may be contoured or canted away from the air gap 134 to minimize shock formation within the air gap 134.

Each electrode has an initiation region to ensure that the induced arc is initiated at a known location. The first electrode 130 has a first initiation region 140 and the second electrode 132 has a second initiation region 142. The first and second initiation regions 140, 142 face towards the air gap 134 and are configured to ensure an induced arc is initiated at a known location on the first and second electrodes 130, 132. To ensure the arc is initiated between the corresponding initiation regions 140, 142, they may define a minimum gap distance $D_{GAP}$ between the electrodes 130, 132. For example, the first and second electrodes 130, 132 each may have a contoured surface such that the $D_{GAP}$ between the electrodes 130, 132 at the initiation regions 140, 142 may be less than the $D_{GAP}$ downstream from the initiation region 140, 142. Thus, the $D_{GAP}$ may vary in the direction of the airstream 118. The initiation regions 140, 142 ensure that the electrodes 130, 132 also have a known operative length 144 in the direction of the airstream 118. Having a fixed or known operative length 144 for the induced arc ensures accurate determination of the $f_{arc}$ and thus the airspeed $V_{AIR}$ of the airstream 118. In another embodiment, the first and second initiation regions 140, 142 may have a lower impedance than the downstream portion of the electrode to ensure that the arc is induced therebetween at a known location. It should be appreciated that other methods of ensuring that the arc is initiated between the corresponding initiation regions 140, 142 are also contemplated.

The contoured initiation regions 140, 142 may be disposed near or at the front of each electrode 130, 132 where the airstream 118 enters the gap. By disposing the initiation regions 140, 142, and thus the minimum $D_{GAP}$, at the entrance of the electrode arc sensors 122, 124, 126, the known operative length 144 can be optimized by utilizing the entirety of the electrodes 130, 132 in the direction of the airstream 118. A longer known operative length 144 may improve the $f_{arc}$ determination accuracy. The contour angle of the initiation regions 140, 142 may be chosen based on the maximum velocity of the aircraft 100. For example, the contour angle should not be greater than the primary shock angle at a maximum Mach number of a supersonic and/or hypersonic aircraft 100. The location of the initiation regions 140, 142 should be chosen to maximize the known operative length 144 in the direction of travel of the fluid medium.

An insulative material 146 may be disposed on the fuselage 106 surface to ensure that the induced arc remains constrained between the electrodes 130, 132 rather than short-circuiting via the fuselage 106. The electrodes 130, 132 may also be spaced away from the fuselage 106 to further isolate the electrodes from the fuselage 106 to ensure that the induced arc travels the length of the electrode 130, 132 in the direction of travel of the airstream 118 rather than short-circuiting via the fuselage 106. The induced arc may emit broad-spectrum electromagnetic interference (EMI) which may interfere with other onboard systems such as communication systems, navigational systems, and the like. To suppress EMI, each electrode-arc sensors 122, 124, 126 may include a Faraday cage such a wire mesh enclosure 148 which imparts little effect on the incident airstream 118 while shielding against EMI. The wire mesh enclosure 148 is depicted as a rectangular structure for illustrative purposes; however, it should be appreciated that the wire mesh enclosure 148 may be contoured to match the shape of the electrode arc sensor 122, 124, 126. In another embodiment, the wire mesh enclosure 148 may be supported by the first and second pylons 136, 138 rather than the exterior surface of the fuselage 106. Wires of the wire mesh enclosure 148 may be insulated with plastic, porcelain, or other insulating material to prevent short-circuit of the arc from first pylon 136 or second pylon 138.

Figure 3:
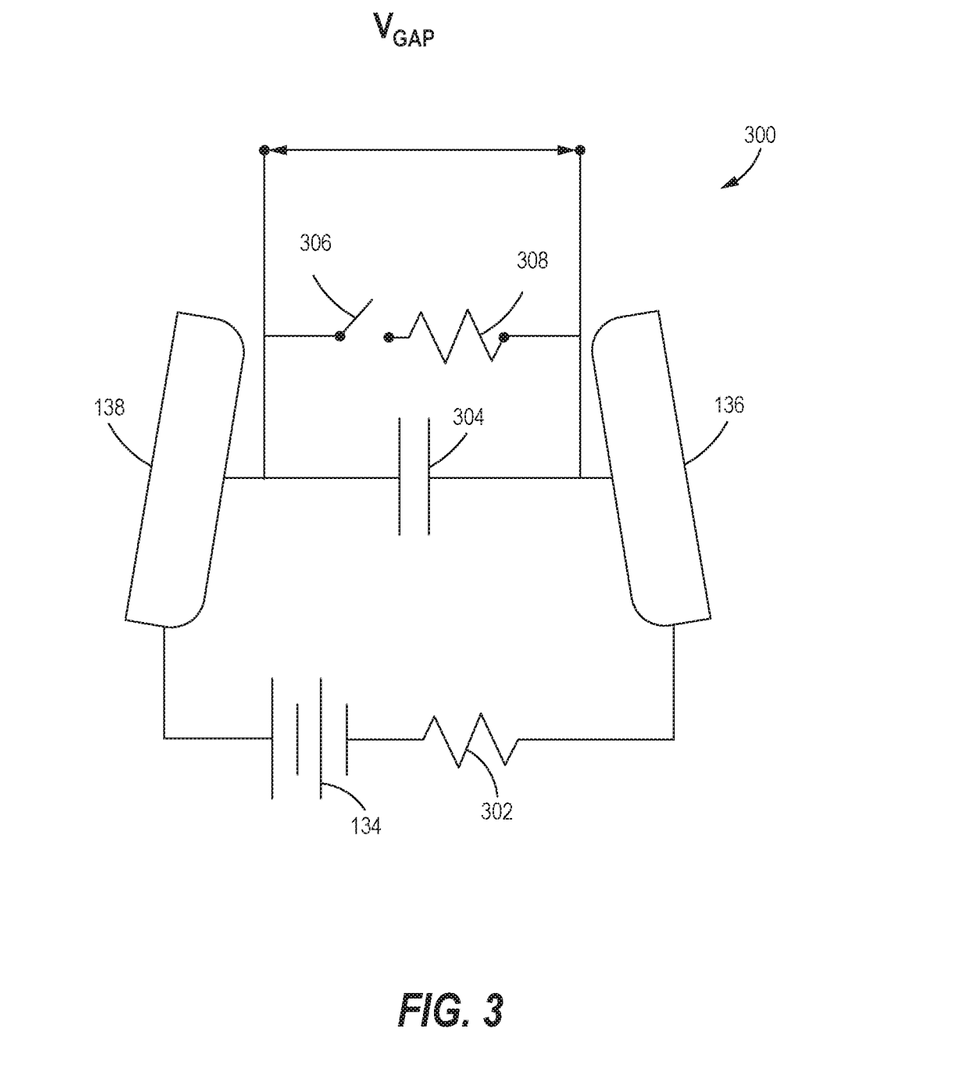
FIG. 3 is an equivalent circuit diagram of the air data sensor in accordance with an example of the present disclosure.

With reference to FIG. 3, an equivalent circuit diagram 300 illustrating the electrode-arc sensor 122, 124, 126 is presented in accordance with the illustrative embodiment. In the illustrated embodiment, the processor 150 is configured to control the voltage source 154 to generate a constant voltage $V_S$ which is applied across the system's internal resistance 302, with internal resistance $R_S$ to each electrode-arc sensor 122, 124, 126, more specifically, $V_S$ is applied across the first and second electrodes 130, 132. The physical arrangement of the electrodes 130, 132 forms an equivalent capacitor 304 with capacitance $C_{GAP}$ with the airstream 118 acting as the dielectric. As the current associated with $V_S$ flows through the system to the electrodes 130, 132, the voltage in the capacitor 302 rises toward the asymptotic limit of $V_S$ with a time constant of $R_S C_{GAP}$. Before the voltage $V_{GAP}$ across the electrodes reaches $V_S$, the breakdown voltage $V_B$ is achieved and an arc is induced between the first and second electrodes 130, 132. As previously mentioned, once $V_B$ is achieved an arc is induced between the first and second electrodes 130, 132 which acts as a switch 306 closing. However, the resistance $R_{ARC}$ of the equivalent resistor 308 is much lower than the internal resistance $R_S$. Thus the capacitance $C_{GAP}$ begins to discharge through the lower resistance $R_{ARC}$ and discharges with a time constant of approximately $R_{ARC} C_{GAP}$ to quickly reach the asymptotic limit of the arc holding voltage $V_A$. As the airstream 118 blows the arc towards the rearwards end of the electrode-arc sensor 122, 124, 126, the gap distance $D_{GAP}$ and the corresponding arc length increases due to the contoured profile and thus as the $D_{GAP}$ increases so does the resistance $R_{ARC}$. When the airstream 118 blows the arc past the electrodes, the arc is extinguished and the cycle repeats with the gap voltage $V_{GAP}$ again rising toward $V_S$.

Figure 4:
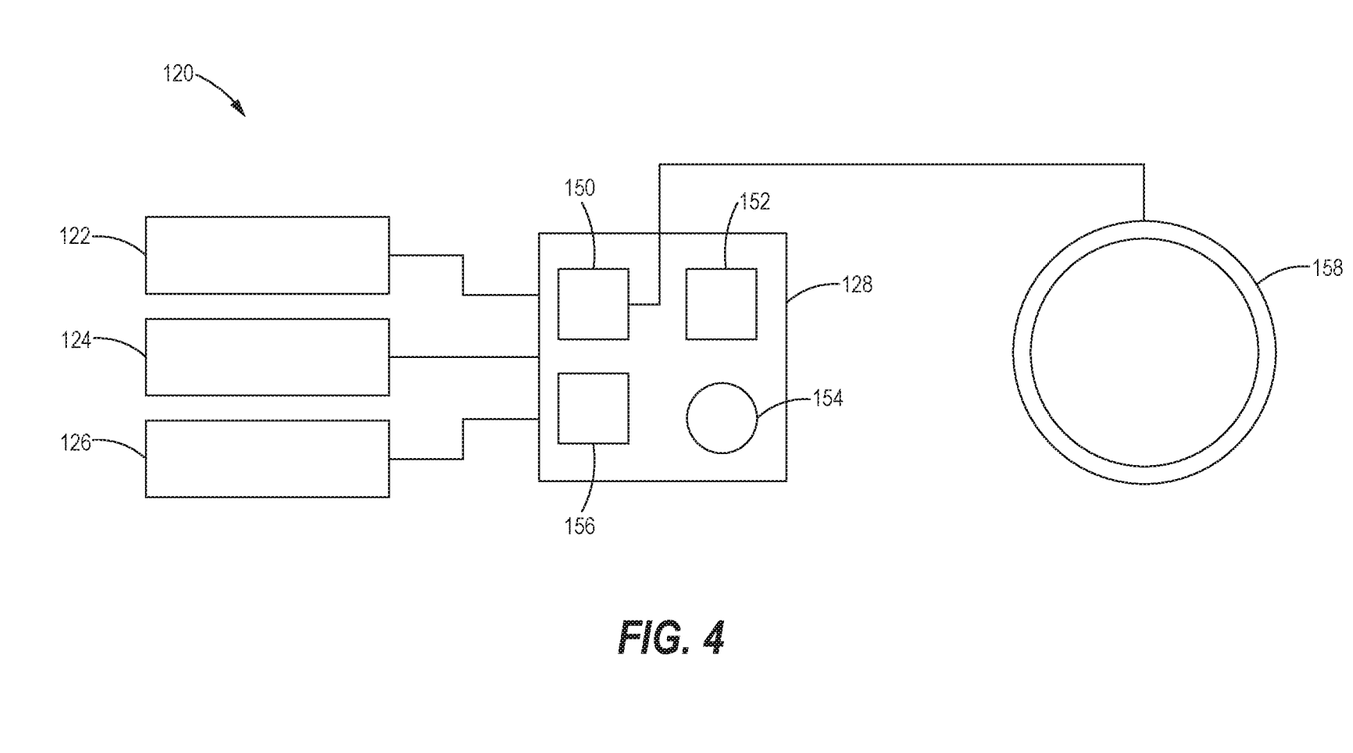
FIG. 4 is a schematic diagram of the air data system in accordance with an example of the present disclosure.

With reference to FIG. 4, a schematic diagram of the air data system 120 is depicted in accordance with the illustrative embodiment. The air data controller 128 may include a processor 150, a memory module 152, a voltage source 154, a voltage sensor 156, and an indicator 158. The voltage source 154 is electrically connected across the electrodes 130, 132 of each electrode-arc sensor 122, 124, 126. Only one voltage source 154 and voltage sensor 156 are shown for illustrative purposes; however, multiple voltage sources and sensors may be implemented with each being operatively connected to or one or more electrode-arc sensors 122, 124, 126.

The processor 150 is configured to control the voltage source 154 to generate a constant voltage signal which is applied to each of the electrode-arc sensors 122, 124, 126 until the $V_B$ is achieved and an arc is induced within the electrode-arc sensor 122, 124, 126. After the arc is induced, the processor 150 controls the voltage source 154 to maintain a holding voltage between the electrodes 130, 132 to preserve the induced arc until it can be forced past the electrode by the airstream 118 and thus extinguished.

The processor 150 is configured to continuously or repeatedly measure the voltage $V_{GAP}$ across the electrodes 130, 132 with the voltage sensor 156. The air gap 134 acts like a capacitor and the arc acts like a switch. When no arc is present, the switch is open, but when $V_B$ is achieved and an arc is induced, the switch becomes closed thus connecting the pair of electrodes 130, 132 and allowing the current $I_{GAP}$ to flow therebetween. Once the arc is extinguished by the airstream 118 the cycle repeats. It should be appreciated that the processor 150 can continuously or repeatedly measure the current $I_{GAP}$ through the electrodes 130, 132 instead of the voltage $V_{GAP}$ across the electrodes 130, 132.

Figure 5:
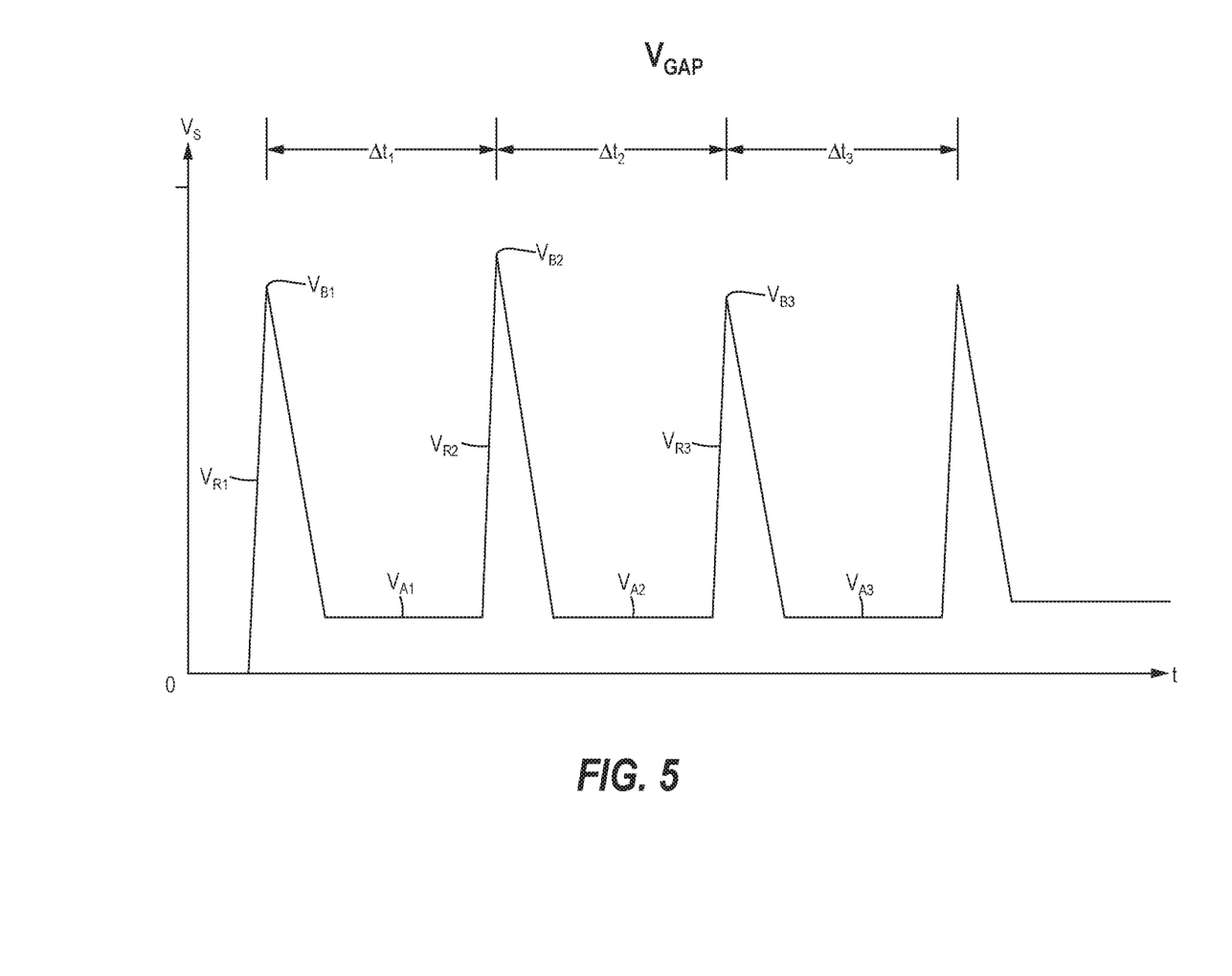
FIG. 5 is a graph of a breakdown voltage of the air data sensor over multiple arc cycles in accordance with an example of the present disclosure.

As shown in FIG. 5, a graph of the measured $V_{GAP}$ over three arc cycles is presented. The processor 150 controls the voltage $V_S$ generated by voltage source 154 to ramp up the voltage $V_{R1}, V_{R2}, V_{R3}$ until the breakdown voltage $V_{B1}, V_{B2}, V_{B3}$ is achieved. Once the breakdown voltage $V_{B1}, V_{B2}, V_{B3}$ is achieved, the voltage falls to the arc holding voltage $V_{A1}, V_{A2}, V_{A3}$ until the arc expires due to the airstream 118 forcing the arc past the electrode. The processor 150 analyzes the time series voltage measurements to identify the amplitude of the peaks as the corresponding breakdown voltages $V_B$ and to identify the arc cycle length $\Delta t_1, \Delta t_2, \Delta t_2$ between peaks to determine the arc frequency $f_{arc}$ which is determined as the inverse of the arc cycle length $\Delta t$.

Figure 6A:
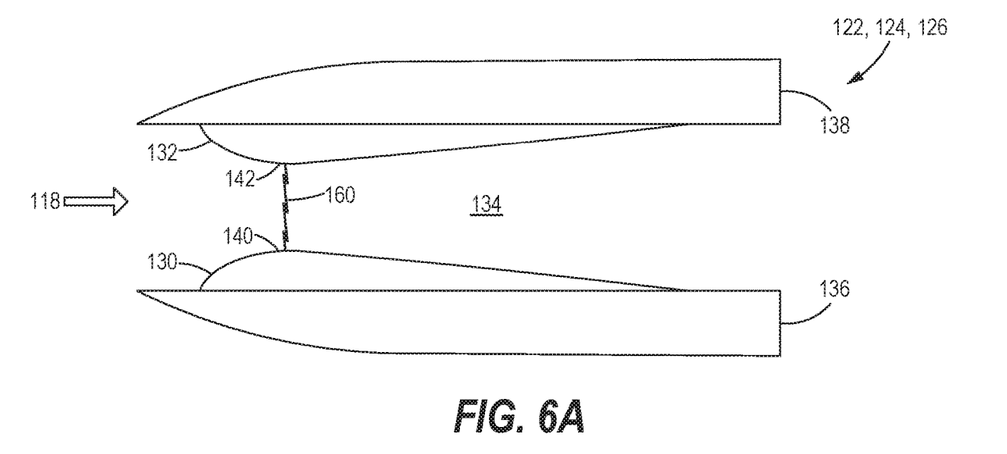
FIGS. 6A-6C are illustrations of the air data sensor in operation in accordance with an example of the present disclosure.
Figure 6B:
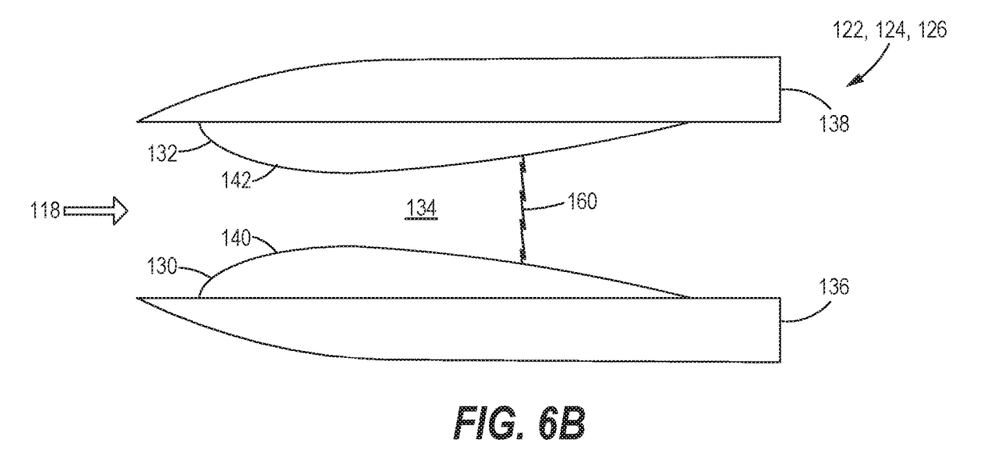
Figure 6C:
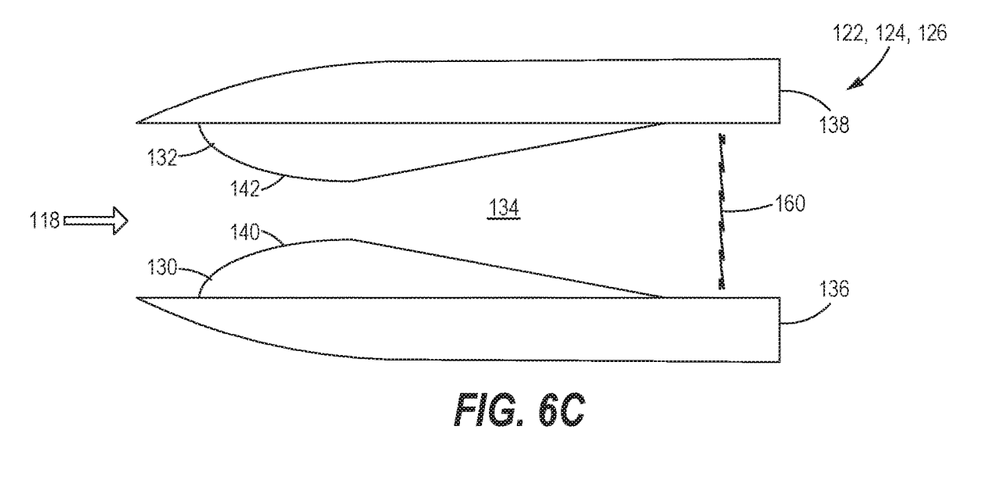

With reference to FIGS. 6A-6C, illustrations of the operation of the electrode-arc sensor 122, 124, 126 with an arc 160 traversing through the air gap 134 is presented in accordance with the illustrative embodiment. In FIG. 5A, the arc 160 is initiated at time t=1 when $V_{GAP}=V_B$, i.e. the output of a voltage source 154 is now equal to the breakdown voltage and the arc 160 is induced. The air surrounding the arc 160 becomes ionized and thus susceptible to being acted on by the airstream 118. In FIG. 5B, a portion of the time interval is $\Delta t_1$ is depicted. In particular, after $V_{B1}$ has been achieved the voltage $V_{GAP}$ steady states at $V_A$, the holding voltage of the arc. During this interval, the arc 148 persists between the electrodes 130, 132 but has been pushed rearward by the airstream 118 past the initiation regions 140, 142 but not yet beyond the electrodes 130, 132 themselves. The $V_A$ may slightly increase due to the gap distance $D_{GAP}$ slightly increasing in the rearward direction until the arc 160 has been forced past the rear end of the electrodes 130, 132 as shown in FIG. 5C. In particular, the arc holding voltage $V_A$ may slightly increase based on the contoured shape of the electrodes 130, 132. This process can be repeated to maintain constant air data measurements.

Figure 7:
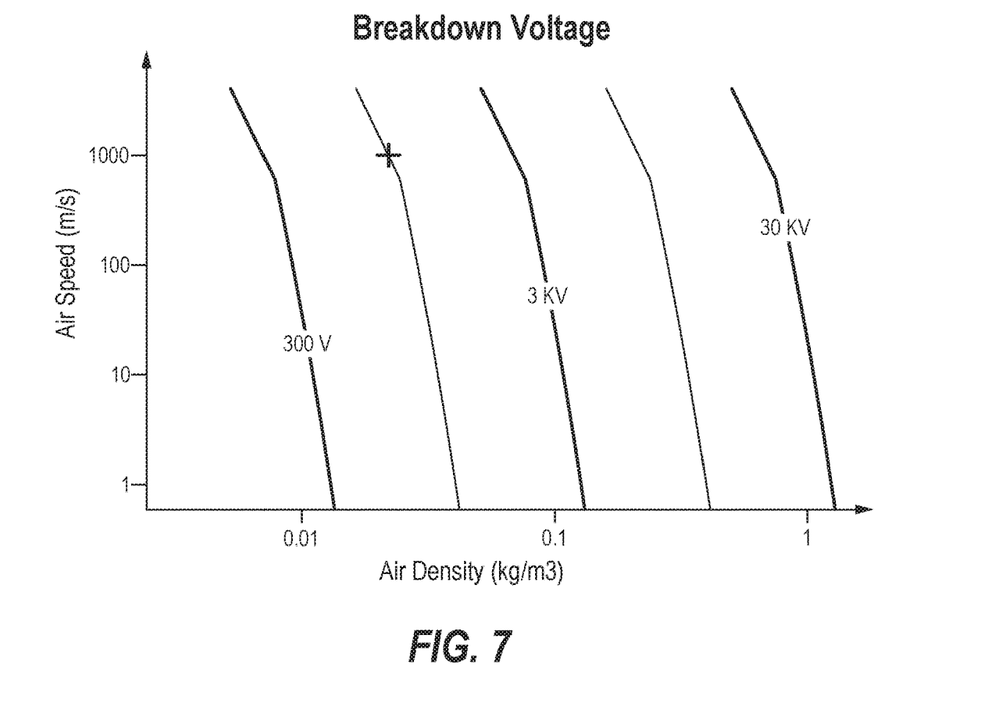
FIG. 7 is a mapping which relates airspeed and air density to breakdown voltage of the air data sensor in accordance with an example of the present disclosure.
Figure 8:
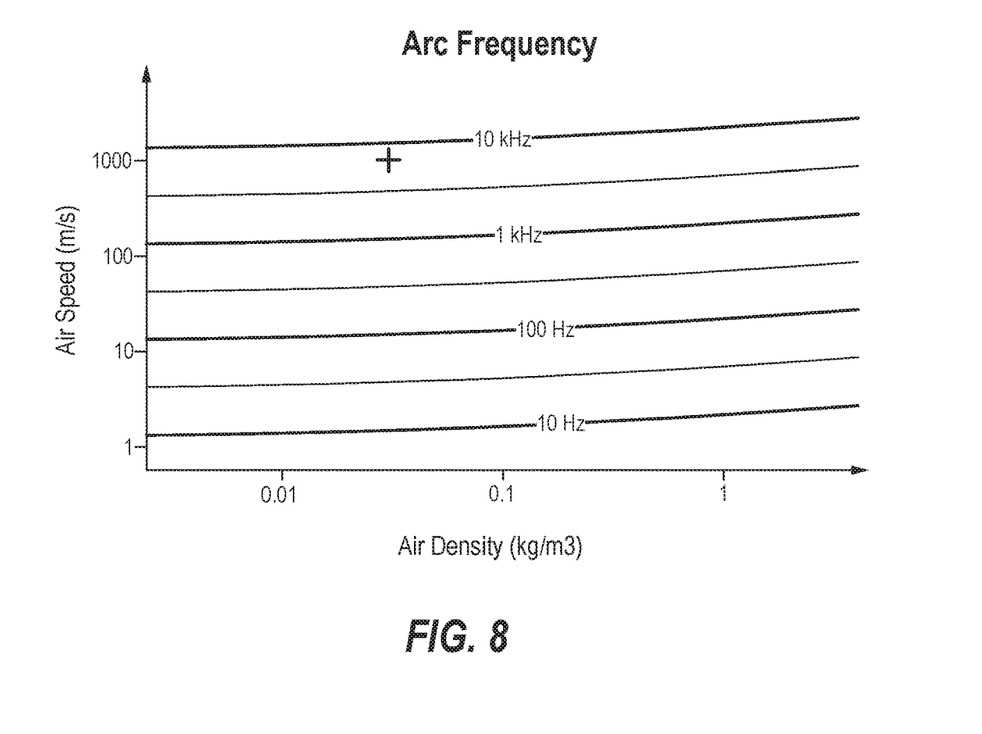
FIG. 8 is a mapping which relates airspeed and air density to arc frequency of the air data sensor in accordance with an example of the present disclosure.

The processor 150 compares the determined $V_B$ and $f_{arc}$ to a predetermined air data model which is stored in the memory module 152. With references to FIGS. 7 and 8, the mappings which relate airspeed $V_{AIR}$ (m/S) to $V_B$ and air density $\rho_{AIR}$ (kg/m³) to $f_{ARC}$, respectively, are depicted in accordance with the illustrated embodiment. The mappings can be predetermined based on computational modeling, real-world measurements, testbed measurements, or any combination thereof. For example, in the illustrative embodiment of an aircraft, the mappings can be generated by any combination of flight test measurements, wind tunnel measurements, and computational simulations. The mappings can be The processor 150 estimates the airspeed $V_{AIR}$ and air density $\rho_{AIR}$, 170 & 172, by comparing or parsing the determined $V_B$ and $f_{arc}$ to the air data model stored in the memory module 152. The estimated airspeed $V_{AIR}$ and air density $\rho_{AIR}$ can be outputted to the indicator 158 for visual confirmation by an operator, such as a pilot. The estimated $V_{AIR}$ and $\rho_{AIR}$ can also be used by other on-board systems to ensure proper operation of the aircraft 100.

In the illustrative embodiment, the voltage source 154 is a direct current source (DC); however, it may be easier to achieve higher voltages with an alternating current (AC) source. At frequencies lower than 100 Hz, the sinusoidal half-cycle may act similar to a DC current. For example, the portion of the sinusoid in which the absolute voltage rises from zero may represent the ramp voltage $V_R$. Breakdown may occur at the subsequent amplitude peak after which the arc is induced and current flows between the electrodes 130, 132 until the AC voltage becomes less than the holding voltage and the arc dissipates before the airstream 118 can force it beyond the rear end of the electrodes 130, 132. However, at frequencies greater than 100 Hz, the absolute voltage recovers to or beyond the holding voltage such that the induced arc persists until the airstream 118 forces the arc beyond the rear end of the electrodes 130, 132.

In another embodiment, the arc is initiated by a laser-induced plasma channel (LIPC) which connects the two electrodes. The processor 150 controls one or more lasers to fire high-intensity laser beams having wavelengths and intensities selected to ionize the air between the electrodes 130, 132 to induce the arc therebetween. The processor 150 detects the induced arc based on the sensed voltage signal from the sensor 156. Once the arc is detected, the processor 150 can control the voltage source 154 to sustain the holding voltage without having to generate the large ramp voltage $V_R$ to $V_B$. Once an arc is extinguished and the sensed voltage returns to $V_{SYS}$, the processor 150 repeats the cycle and controls the one or more lasers to fire a subsequent laser beam and detects the onset of the induced arc. Since $V_B$ is not generated by the voltage source 154, the air data system 120 may not be able to determine the air density $\rho_{AIR}$ in this embodiment; however, it may be determined based on the minimum intensity of the laser to induce an arc. For example, the processor 150 may ramp the laser power until an LIPC is initiated.

Figure 9:
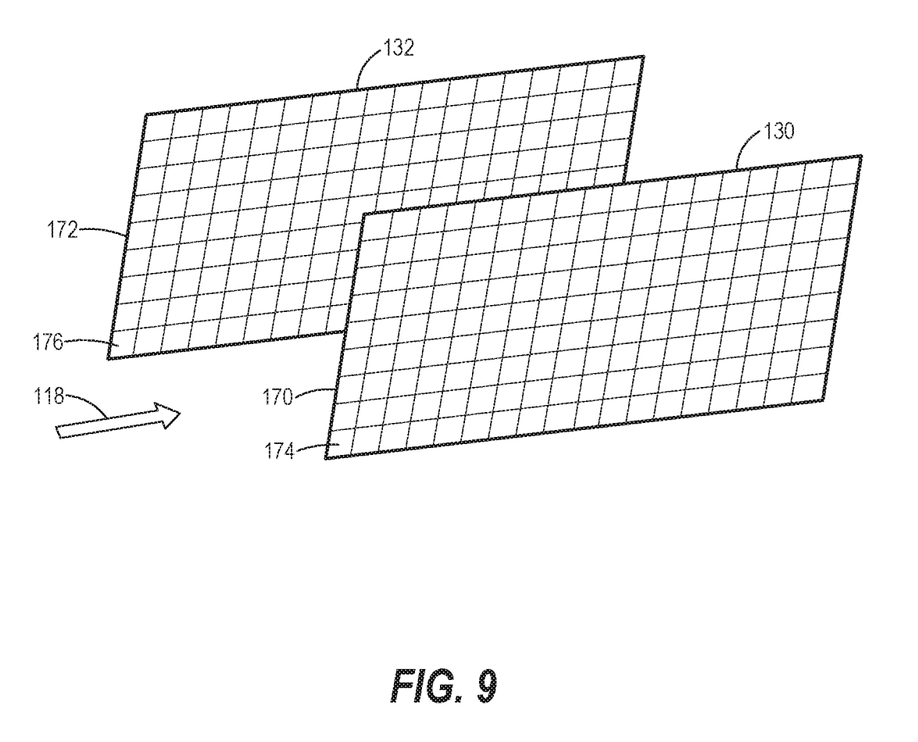
FIG. 9 is a schematic diagram of the air data sensor in accordance with another example of the present disclosure.

With reference to FIG. 8, a first and second array 180, 182 of sub-electrodes 184, 186 is depicted in accordance with another embodiment of the present disclosure. Each electrode 130, 132 may include an array of sub-electrodes arranged in a known configuration to track the trajectory of the induced arc while it travels towards the rear end. The first electrode 130 includes a first array 180 of sub-electrodes and the second electrode 132 includes a second array 182 of sub-electrodes 186. The processor 150 is configured to determine an AoA vector and/or side slip vector based on a direction of travel of the induced arc relative to the array of sub-electrodes. In particular, the processor 150 is configured to measure the voltage $V_{GAP}$ of each unique pair of the sub-electrodes 184, 186 and identify between which sub-electrodes 184, 186 the induced arc is currently connecting via a short circuit. The processor 150 can generate a time series of voltage measurements for each unique pair of sub-electrodes 184, 186 between the pair of arrays 180, 182 and maps a time series trajectory of the arc between the array 180, 182 of sub-electrodes 184, 186 to determine the AoA vector and/or side slip vector.

Figure 10:
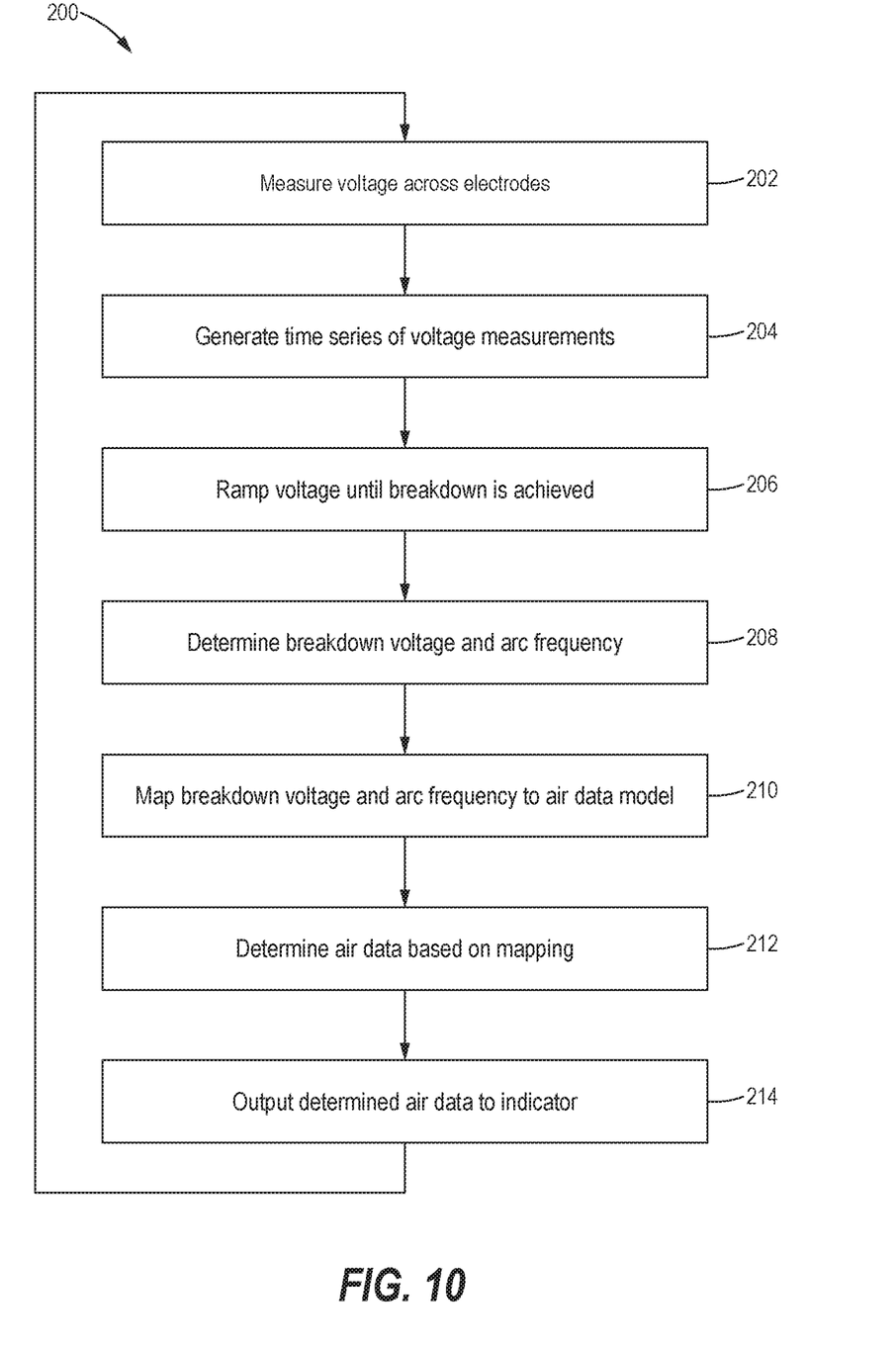
FIG. 10 is a method for determine air data of an aircraft in accordance with an example of the present disclosure.

With reference to FIG. 9, a method 200 for determining air data of an aircraft 100 traveling through an airstream 118 is presented in accordance with the illustrative embodiment. In step 202, the processor 150 is configured to measure the gap voltage $V_{GAP}$ based on the detected voltage by the voltage sensor 156, step 202. The processor 150 generates a time series of voltage measurements across the pair of electrodes 130, 132, step 204. In particular, the processor 150 can measure $V_{GAP}$ and store the measurement with a corresponding timestamp in the memory module 152. In step 206, the processor 150 controls the voltage source 154 to ramp the voltage $V_S$ to increase $V_{GAP}$ the across the electrodes until a breakdown voltage $V_B$ is achieved and to maintain the voltage $V_S$ until the arc is dissipated by the incident airstream 118. In step 208, the processor 150 determines the breakdown voltage $V_B$ and arc frequency $f_{arc}$ of the induced arc based on the time series of voltage measurements. At step 210, the processor 150 maps the determined the breakdown voltage $V_B$ and arc frequency $f_{arc}$ to a predetermined air data model. Based on the mapping, the processor 150 can determine corresponding air data of the aircraft 100 such as estimating the airspeed $V_{AIR}$ and the air density $\rho_{AIR}$, step 212. In step 214, the air data, e.g. airspeed $V_{AIR}$ and/or air density $\rho_{AIR}$, can be displayed on the indicator 158 for inspection by an operator. Processor 150 repeats the method of determining the air data continuously in real-time or at regular intervals during operation of the aircraft 100 to ensure the present values related to the air data are available for on-board systems and the operator(s) to ensure proper operation of the aircraft 100.

The examples described in detail above are within the scope of the appended claims. It is contemplated that numerous other modifications and variations may be created taking advantage of the disclosed approach. In short, it is the applicant's intention that the scope of the patent issuing herefrom be limited only by the scope of the appended claims.

What is claimed is:

1. An electrode-arc sensor for measuring fluid data, comprising:
    a first electrode and a second electrode arranged parallel and spaced from the first electrode to form a fluid gap therebetween for receiving a fluid stream, wherein the first and second electrodes directly contact the fluid stream;
    a voltage source operatively connected to the first and second electrodes and configured to generate a voltage sufficient to induce an arc therebetween;
    a voltage sensor configured to detect voltage measurements across the first and second electrodes;
    a controller operatively connected to the voltage source and voltage sensor, the controller configured to:
        command the voltage source to generate a voltage until the arc is induced;
        generate a time-series of voltage measurements from the voltage sensor; and
        determine a fluid speed and a fluid density of the fluid stream based on the time-series of voltage measurements.

2. The electrode-arc sensor of claim 1, wherein the controller is further configured to:
    determine an arc lifetime and a breakdown voltage of the arc based on the time-series of voltage measurements; and
    determine the fluid speed based on the arc lifetime and determine the fluid density based on the breakdown voltage.

3. The electrode-arc sensor of claim 2, wherein the breakdown voltage and the arc lifetime are compared to a fluid data model to determine the fluid speed and fluid density.

4. The electrode-arc sensor of claim 3, wherein the fluid data model is predetermined based on at least one of test data or simulation data to relate both fluid speed and fluid density to arc lifetime and breakdown voltage.

5. The electrode-arc sensor of claim 1, wherein each electrode has an arc initiation region facing the fluid gap.

6. The electrode-arc sensor of claim 5, wherein each arc initiation region defines a minimum gap distance between the first and second electrodes.

7. The electrode-arc sensor of claim 1, wherein the first and second electrodes are contoured with a forward ramp angle less than a primary shock angle to minimize shock formation.

8. The electrode-arc sensor of claim 1, wherein
    the first electrode includes a first array of sub-electrodes;
    the second electrode includes a second array of sub-electrodes, wherein each sub-electrode of the first array of sub-electrodes is paired with a selected sub-electrode of the second array of sub-electrodes to form a plurality of unique pairs of sub-electrodes;
    the voltage sensor is further configured to detect voltage across each unique pair of sub-electrodes in the plurality of sub-electrodes;
    the controller is further configured to:
        map a time-series trajectory of the arc based on the time-series of voltage measurements at each unique pair of sub-electrodes, and
        determine an angle of attack vector or side slip vector based on the time-series trajectory.

9. A vehicle comprising:
    an external surface in direct communication with a fluid medium;
    at least one electrode-arc sensor disposed on the external surface to determine fluid data of the fluid medium, the electrode-arc sensor comprising:
    a first electrode and a second electrode arranged parallel and spaced from the first electrode to form a fluid gap therebetween for receiving a fluid stream, wherein the first and second electrodes directly contact the fluid stream;
    a voltage source operatively connected the first and second electrodes and configured to generate a voltage sufficient to induce an arc therebetween;
    a voltage sensor configured to detect voltage measurements across the first and second electrodes;
    a controller operatively connected to the voltage source and the voltage sensor, the controller is configured to:
        command the voltage source to generate a voltage until the arc is induced; generate a time series of the voltage measurements from the voltage sensor;
        determine a fluid speed and fluid density of the fluid stream based on the time series of the voltage measurements; and
        display the fluid speed on an indicator.

10. The vehicle according to claim 9, further comprising;
    a plurality of electrode-arc sensors, each having a unique orientation relative to an axis of the vehicle; and
    wherein the controller is further configured to determine a side-slip angle or an angle of attack of the vehicle based on the time series of the voltage measurements and the unique orientation of each electrode-arc sensor.

11. The vehicle according to claim 9, wherein the controller is further configured to:
    determine an arc lifetime and a breakdown voltage of the arc based on the time series of the voltage measurements; and
    determine the fluid density based on the breakdown voltage and determine the fluid speed based on the arc lifetime of the arc.

12. The vehicle according to claim 11, wherein the breakdown voltage and the arc lifetime are compared to a fluid data model to determine the fluid speed and fluid density.

13. The vehicle according to claim 12, wherein the fluid data model is predetermined based on at least one of test data or simulation data to relate both fluid speed and fluid density to arc lifetime and to breakdown voltage.

14. The vehicle according to claim 9, wherein each electrode has an arc initiation region facing the fluid gap.

15. The vehicle according to claim 14, wherein each arc initiation region defines a minimum gap distance between the first and second electrodes.

16. The vehicle according to claim 9, wherein
the first electrode includes a first array of sub-electrodes;
the second electrode includes a second array of sub-electrodes, wherein each sub-electrode of the first array of sub-electrodes is paired with a selected sub-electrode of the second array of sub-electrodes to form a plurality of unique pairs of sub-electrodes;
the voltage sensor is further configured to detect voltage across each unique pair of sub-electrodes in the plurality of sub-electrodes;
the controller is further configured to:
map a time-series trajectory of the arc based on the time series of the voltage measurements at each unique pair of sub-electrodes, and
determine an angle of attack vector or side slip vector based on the time-series trajectory.

17. A method for determining fluid data of a vehicle traveling through a fluid medium, the method comprising:
controlling a voltage source to generate a voltage sufficient to induce an arc between a first electrode and a second electrode, the first electrode being parallel to and spaced from the second electrodes to form a fluid gap therebetween for receiving a fluid stream, wherein the first and second electrodes directly contact the fluid stream;
detecting voltage measurements across the first and second electrodes;
commanding the voltage source to generate a voltage until the arc is induced; generating a time series of the voltage measurements; and
determining a fluid speed and fluid density of the fluid stream based on the time series of the voltage measurements.

18. The method of claim 17, the method further comprising:
determining an arc lifetime and breakdown voltage of the arc based on the time series of the voltage measurements; and
determining the fluid density based on the breakdown voltage and determining the fluid speed based on the arc lifetime of the arc.

19. The method of claim 18, wherein the breakdown voltage and arc lifetime are compared to a fluid data model to determine the fluid speed and fluid density.

20. The method of claim 18, the method further comprising:
determining a side-slip angle or an angle of attack of the vehicle based on the time series of the voltage measurements from a plurality of voltage sensors, each associated with at least one electrode-arc sensor, and a corresponding relative orientation of each electrode-arc sensor to a chord line of the vehicle.

* * * * *